United States Patent
Yoo

(10) Patent No.: US 9,168,902 B2
(45) Date of Patent: Oct. 27, 2015

(54) METHOD AND SYSTEM FOR CONTROLLING BRAKING OF VEHICLE

(71) Applicants: Hyundai Motor Company, Seoul (KR); Kia Motors Corporation, Seoul (KR)

(72) Inventor: Byoung Soo Yoo, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/099,699

(22) Filed: Dec. 6, 2013

(65) Prior Publication Data

US 2014/0288794 A1  Sep. 25, 2014

(30) Foreign Application Priority Data

Mar. 19, 2013 (KR) .................. 10-2013-0029324

(51) Int. Cl.
| | |
|---|---|
| G06F 19/00 | (2011.01) |
| G06F 7/70 | (2006.01) |
| G06G 7/00 | (2006.01) |
| G06G 7/76 | (2006.01) |
| B60T 8/171 | (2006.01) |
| B60T 8/172 | (2006.01) |
| B60T 8/26 | (2006.01) |

(52) U.S. Cl.
CPC ............... *B60T 8/171* (2013.01); *B60T 8/172* (2013.01); *B60T 8/266* (2013.01)

(58) Field of Classification Search
USPC ............ 701/70, 29.1, 32.8, 48; 477/185, 183, 477/182, 184; 303/151, 2, 10, 11, 13, 14, 303/122, 152; 60/562, 547.1
See application file for complete search history.

(56) References Cited

U.S. PATENT DOCUMENTS

| | | | | |
|---|---|---|---|---|
| 5,171,072 | A | * 12/1992 | Maehara ................. | 303/114.1 |
| 6,019,438 | A | * 2/2000 | Sawada et al. ........... | 303/113.4 |
| 6,039,411 | A | * 3/2000 | Tozu et al. ............... | 303/116.1 |
| 6,120,110 | A | * 9/2000 | Shimizu .................. | 303/113.4 |
| 6,120,414 | A | * 9/2000 | Endo et al. ............... | 477/185 |
| 6,276,763 | B1 | * 8/2001 | Isono et al. .............. | 303/114.1 |
| 6,280,008 | B1 | * 8/2001 | Yoshida .................. | 303/155 |
| 6,283,559 | B1 | * 9/2001 | Yamada et al. .......... | 303/113.3 |
| 6,322,164 | B1 | * 11/2001 | Sakamoto et al. ........ | 303/115.4 |
| 6,322,168 | B1 | * 11/2001 | Ohnuma .................. | 303/155 |
| 6,328,389 | B1 | * 12/2001 | Yotsuya et al. .......... | 303/113.3 |
| 6,354,672 | B1 | * 3/2002 | Nakamura et al. ....... | 303/113.1 |

(Continued)

FOREIGN PATENT DOCUMENTS

| | | |
|---|---|---|
| JP | 2002-104151 A | 4/2002 |
| JP | 4905369 (B2) | 1/2012 |

(Continued)

*Primary Examiner* — Ronnie Mancho
(74) *Attorney, Agent, or Firm* — Morgan, Lewis & Bockius LLP

(57) ABSTRACT

A method and a system controls braking of a vehicle. The method includes: detecting a pedal stroke, booster negative pressure, and master cylinder hydraulic pressure; setting target master cylinder hydraulic pressure on the basis of the detected pedal stroke and the detected booster negative pressure in a case in which a magnitude of the detected booster negative pressure is smaller than a magnitude of predetermined reference booster negative pressure; and compensating for the master cylinder hydraulic pressure in a case in which the detected master cylinder hydraulic pressure is smaller than the predetermined target master cylinder hydraulic pressure.

14 Claims, 5 Drawing Sheets

(56) References Cited

U.S. PATENT DOCUMENTS

| | | | |
|---|---|---|---|
| 6,412,881 B1* | 7/2002 | Isono | 303/114.1 |
| 6,755,116 B1* | 6/2004 | Tsubouchi et al. | 91/369.2 |
| 2002/0033640 A1* | 3/2002 | Nishii et al. | 303/113.1 |
| 2002/0060495 A1* | 5/2002 | Mizutani et al. | 303/114.3 |
| 2002/0091479 A1* | 7/2002 | Maruko et al. | 701/96 |
| 2007/0228821 A1* | 10/2007 | Maki et al. | 303/151 |
| 2007/0267915 A1* | 11/2007 | Shimada et al. | 303/122 |
| 2008/0255732 A1* | 10/2008 | Yasui et al. | 701/48 |
| 2009/0096280 A1* | 4/2009 | Yamanao et al. | 303/11 |
| 2009/0230761 A1* | 9/2009 | Sekiguchi et al. | 303/2 |
| 2009/0236903 A1* | 9/2009 | Nishino et al. | 303/3 |
| 2010/0036577 A1* | 2/2010 | Kodama et al. | 701/76 |
| 2010/0161191 A1* | 6/2010 | Kato et al. | 701/70 |
| 2010/0244549 A1* | 9/2010 | Koshimizu et al. | 303/14 |
| 2010/0253137 A1* | 10/2010 | Matsuzaki et al. | 303/155 |
| 2011/0006591 A1* | 1/2011 | Yoshii et al. | 303/4 |
| 2011/0031804 A1* | 2/2011 | Shimada et al. | 303/2 |
| 2011/0066345 A1* | 3/2011 | Nasu et al. | 701/70 |
| 2011/0278113 A1* | 11/2011 | Nishimura et al. | 188/106 P |
| 2012/0073286 A1* | 3/2012 | Takayama et al. | 60/538 |
| 2012/0109482 A1* | 5/2012 | Yoshii | 701/70 |
| 2013/0049449 A1* | 2/2013 | Watanabe | 303/3 |
| 2013/0062932 A1* | 3/2013 | Yagashira | 303/3 |
| 2013/0204512 A1* | 8/2013 | Mizuno et al. | 701/112 |
| 2014/0015310 A1* | 1/2014 | Hanzawa et al. | 303/3 |
| 2014/0142827 A1* | 5/2014 | Shimizu | 701/70 |
| 2014/0288798 A1* | 9/2014 | Ando et al. | 701/93 |
| 2014/0375113 A1* | 12/2014 | Higashi | 303/10 |
| 2015/0061361 A1* | 3/2015 | Maruo et al. | 303/10 |

FOREIGN PATENT DOCUMENTS

| | | |
|---|---|---|
| KR | 100387856 (B1) | 7/2002 |
| KR | 100589185 (B1) | 6/2006 |
| KR | 10-2012-0043178 A | 5/2012 |
| WO | WO 2012/084403 A2 | 6/2012 |

* cited by examiner

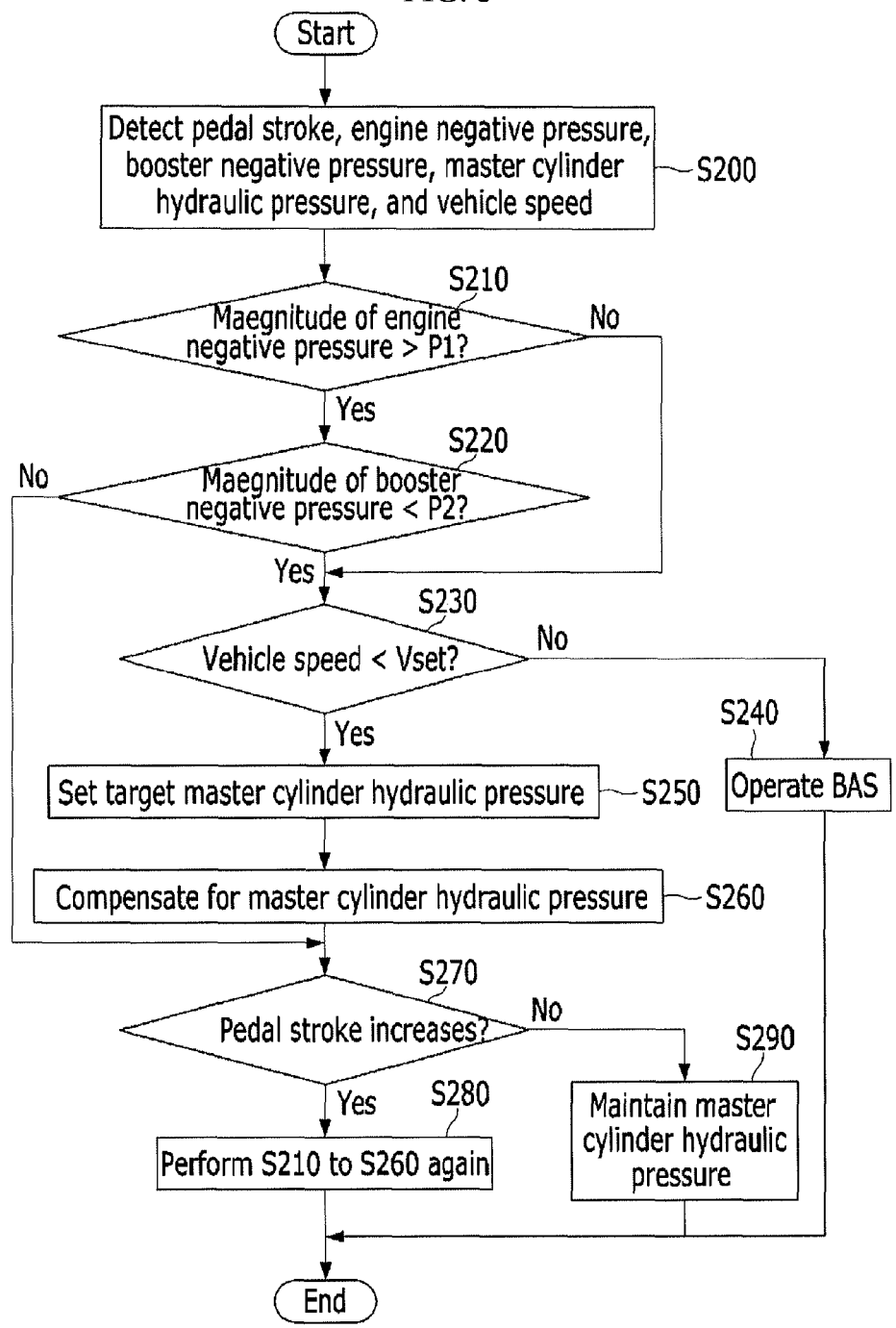

METHOD AND SYSTEM FOR CONTROLLING BRAKING OF VEHICLE

CROSS-REFERENCE TO RELATED APPLICATION

The present application claims priority of Korean Patent Application Number 10-2013-0029324 filed Mar. 19, 2013, the entire contents of which application is incorporated herein for all purposes by this reference.

BACKGROUND OF INVENTION

1. Field of Invention

The present invention relates to a method and a system for controlling braking of a vehicle, and more particularly, to a method and a system for controlling braking of a vehicle, which provide stable braking force by compensating for master cylinder hydraulic pressure in a case in which a required negative pressure is not formed at the time of braking.

2. Description of Related Art

A brake device is provided in a vehicle to decelerate or stop the vehicle being in a state of traveling as necessary.

The brake device generates braking force by converting kinetic energy of the vehicle being in a state of traveling into thermal energy by using frictional force and emitting thermal energy into the atmosphere.

Hydraulic pressure is generated in a master cylinder by an operation of a brake pedal, and the hydraulic pressure is transmitted to a wheel brake such that the vehicle is decelerated or stopped.

Engine negative pressure is generated in an intake stroke, and performance of negative pressure is determined by various factors such as a mechanical frictional load of an engine, efficiency of a transmission, and the like.

In a case in which the engine negative pressure is insufficient, because boosting force by a booster is small, a driver feels that a brake pedal is stiff and the braking force is insufficient at the moment when a magnitude of pressure in a brake hydraulic pressure line and a magnitude of tread force on the brake pedal are identical to each other.

In addition, in a case in which negative pressure, which is required to brake, is not sufficient, operational feeling for the brake pedal deteriorates, and because the braking force is insufficient, a problem of traveling safety may occur.

Accordingly, in order to achieve an improvement on engine negative pressure, a technology is being provided which secures stable brake performance with a method of compensating for the engine negative pressure by additionally including an electric vacuum pump.

However, as the high priced vacuum pump is further added, there are problems in that price competitiveness deteriorates because a manufacturing cost is increased, productivity deteriorates because a layout design and an assembly process are complicated, and fuel efficiency and engine output torque deteriorate because a weight is increased, and a load to drive the vacuum pump is shared.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method and a system for controlling braking of a vehicle, which provide stable braking force by compensating for master cylinder hydraulic pressure in a case in which a required negative pressure is not formed at the time of braking.

Various aspects of the present invention provide for a method for controlling braking of a vehicle, including: detecting a pedal stroke, booster negative pressure, and master cylinder hydraulic pressure; setting target master cylinder hydraulic pressure on the basis of the detected pedal stroke and the detected booster negative pressure in a case in which a magnitude of the detected booster negative pressure is smaller than a magnitude of predetermined reference booster negative pressure; and compensating for the master cylinder hydraulic pressure in a case in which the detected master cylinder hydraulic pressure is smaller than the predetermined target master cylinder hydraulic pressure.

The predetermined target master cylinder hydraulic pressure may be set from master cylinder hydraulic pressure map data according to a pedal stroke at the predetermined reference booster negative pressure.

In the compensating for the master cylinder hydraulic pressure, opening and closing operations of a plurality of solenoid valves may be controlled so as to increase the master cylinder hydraulic pressure up to the predetermined target master cylinder hydraulic pressure.

The method for controlling braking of a vehicle according to various aspects of the present invention may further include detecting engine negative pressure, in which in a case in which a magnitude of the detected engine negative pressure is greater than a magnitude of predetermined reference engine negative pressure, the magnitude of the detected booster negative pressure is compared with the magnitude of the predetermined reference booster negative pressure, and in a case in which a magnitude of the detected engine negative pressure is smaller than the magnitude of the predetermined reference engine negative pressure, target master cylinder hydraulic pressure is set on the basis of the detected pedal stroke and the detected booster negative pressure.

The method for controlling braking of a vehicle according to various aspects of the present invention may further include detecting a vehicle speed; and comparing the detected vehicle speed and a predetermined vehicle speed in a case in which a magnitude of the detected booster negative pressure is smaller than the magnitude of the predetermined reference booster negative pressure, in which in a case in which the detected vehicle speed is higher than the predetermined vehicle speed, a booster is controlled so that boosting force is amplified, and in a case in which the detected vehicle speed is lower than the predetermined vehicle speed, target master cylinder hydraulic pressure is set on the basis of the detected pedal stroke and the detected booster negative pressure.

The method for controlling braking of a vehicle according to various aspects of the present invention may further include determining whether a pedal stroke increases in a case in which the master cylinder hydraulic pressure is compensated and becomes the same as the predetermined target master cylinder hydraulic pressure, in which in a case in which the pedal stroke increases, the setting of the target master cylinder hydraulic pressure and the compensating for the master cylinder hydraulic pressure are performed again.

Various aspects of the present invention provide for a system for controlling braking of a vehicle, including: a pedal stroke sensor configured to detect a pedal stroke of a brake pedal; a booster negative pressure sensor configured to detect negative pressure of a booster; a master cylinder hydraulic pressure sensor configured to detect hydraulic pressure of a master cylinder; a driving unit including a plurality of solenoid valves and configured to adjust hydraulic pressure supplied from the master cylinder to a wheel cylinder; and a control unit operated by a predetermined program so as to control the driving unit on the basis of information inputted through the pedal stroke sensor, the booster negative pressure sensor, and the master cylinder hydraulic pressure sensor.

The system for controlling braking of a vehicle according to various aspects of the present invention may further include a MAP sensor configured to detect air pressure in an intake manifold.

The system for controlling braking of a vehicle according to various aspects of the present invention may further include a wheel speed sensor configured to detect a vehicle speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart of an exemplary method for controlling braking of a vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary throughout the specification, the word "comprise" and variations such as "comprises" or "comprising", will be understood to imply the inclusion of stated elements but not the exclusion of any other elements.

Figure 1:
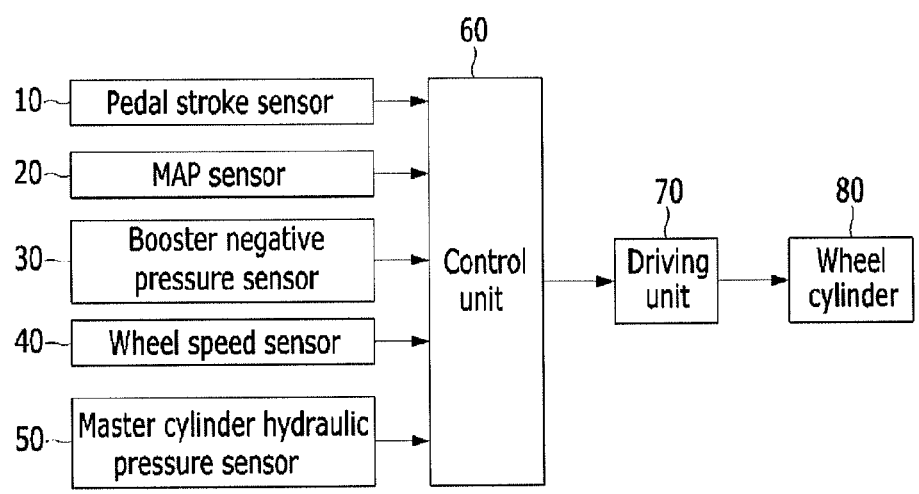
FIG. 1 is a block diagram schematically illustrating an exemplary system for controlling braking of a vehicle according to the present invention.

FIG. 1 is a block diagram schematically illustrating a system for controlling braking of a vehicle according to various embodiments of the present invention.

Figure 2:
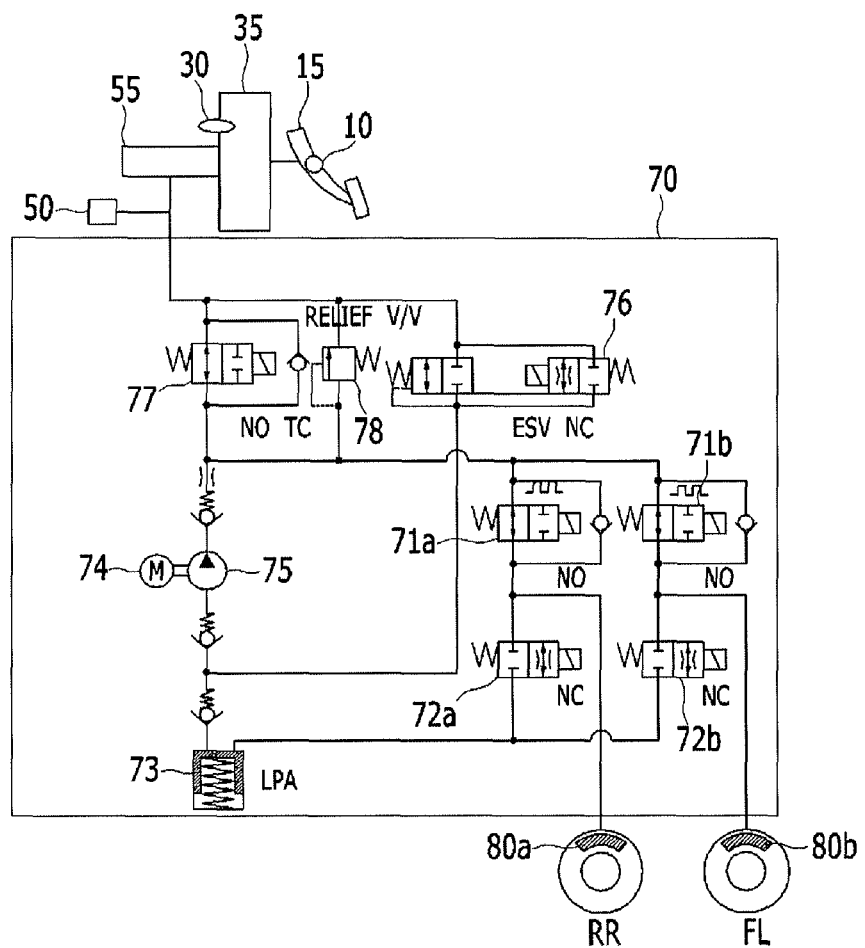
FIG. 2 is a view schematically illustrating a driving unit of the system for controlling braking of FIG. 1 according to the present invention.

FIG. 2 is a view schematically illustrating a driving unit of the system for controlling braking of a vehicle according to various embodiments of the present invention.

Referring to FIGS. 1 and 2, a system for controlling braking of a vehicle according to various embodiments of the present invention may include a pedal stroke sensor 10, a manifold absolute pressure (MAP) sensor 20, a booster negative pressure sensor 30, a wheel speed sensor 40, a master cylinder hydraulic pressure sensor 50, a control unit 60, a driving unit 70, and a wheel cylinder 80.

The pedal stroke sensor 10 detects a pedal stroke of a brake pedal 15 and transmits the detected pedal stroke to the control unit 60.

The MAP sensor 20 detects air pressure in an intake manifold and transmits the detected air pressure to the control unit 60.

The booster negative pressure sensor 30 detects negative pressure of a booster 35 and transmits the detected negative pressure to the control unit 60.

The wheel speed sensor 40 detects a vehicle speed and transmits the detected vehicle speed to the control unit 60.

The master cylinder hydraulic pressure sensor 50 detects hydraulic pressure in a master cylinder 55 and transmits the detected hydraulic pressure to the control unit 60.

The control unit 60 controls the driving unit 70 on the basis of information inputted through the pedal stroke sensor 10, the MAP sensor 20, the booster negative pressure sensor 30, the wheel speed sensor 40, and the master cylinder hydraulic pressure sensor 50.

The control unit 60 may be implemented as at least one microprocessor that is operated by a predetermined program, and this predetermined program may include a series of commands to perform each step included in a method for controlling braking of a vehicle according to various embodiments of the present invention, which will be described below.

The driving unit 70 includes a plurality of solenoid valves, and adjusts hydraulic pressure, which is supplied from the master cylinder 55 to the wheel cylinder 80, in accordance with a control of the control unit 60.

The wheel cylinder 80 is installed on each wheel, and converts hydraulic pressure supplied from the master cylinder 55 through a hydraulic pressure line into mechanical force.

As a plurality of solenoid valves, which adjusts hydraulic pressure supplied to the wheel cylinder 80, normally open (NO) solenoid valves 71, and normally closed (NC) solenoid valves 72 are used. Braking force is adjusted by increasing hydraulic pressure by supplying oil to the wheel cylinder 80 through the NO solenoid valves 71 and the NC solenoid valves 72, or by decreasing hydraulic pressure by discharging oil.

Oil discharged from the wheel cylinder 80 is temporarily stored in a low pressure accumulator (LPA) 73, and a pump 75 sucks and discharges oil stored in the low pressure accumulator (LPA) so as to transmit oil to the wheel cylinder 80 or the master cylinder 55.

An NC electronic shuttle valve (ESV) 76 is installed on an intake flow path, which connects a hydraulic pressure port side of the master cylinder 55 and an inlet side of the pump 75, and opens and closes the intake flow path. An NO traction control solenoid valve (TC) 77 is installed on a discharge flow path, which connects the hydraulic pressure port side of the master cylinder 55 and an outlet side of the pump 75, and opens and closes the discharge flow path. A relief valve 78 returns oil back to the master cylinder 55 when hydraulic pressure discharged from the pump 75 increases more than required.

Figure 3:
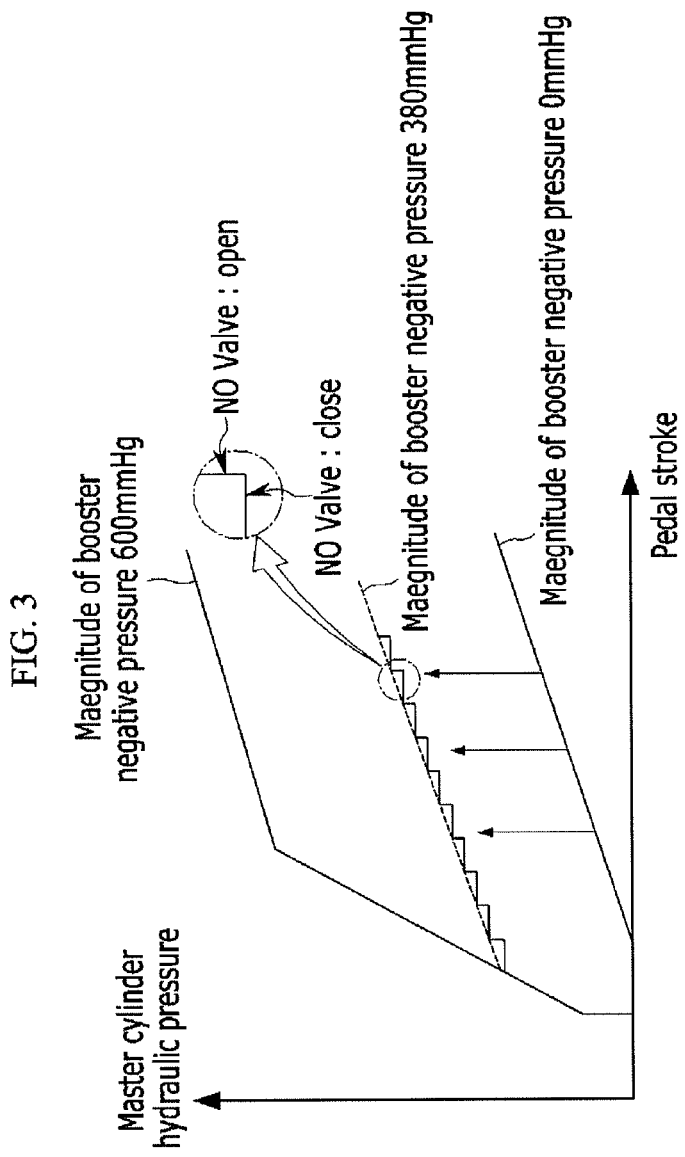
FIG. 3 is a graph illustrating an exemplary master cylinder hydraulic pressure according to a pedal stroke for each magnitude of booster negative pressure according to the present invention.

FIG. 3 is a graph illustrating master cylinder hydraulic pressure according to a pedal stroke for each magnitude of booster negative pressure according to various embodiments of the present invention.

Referring to FIG. 3, as a pedal stroke increases, master cylinder hydraulic pressure increases. Here, when a magnitude of booster negative pressure is large, a larger magnitude of master cylinder hydraulic pressure is formed at the same pedal stroke.

In order to form master cylinder hydraulic pressure that is required to brake, a magnitude of booster negative pressure needs to be a predetermined value or more.

Therefore, when booster negative pressure, which is required to brake, is not formed, it is necessary to compensate for master cylinder hydraulic pressure.

Figure 4:
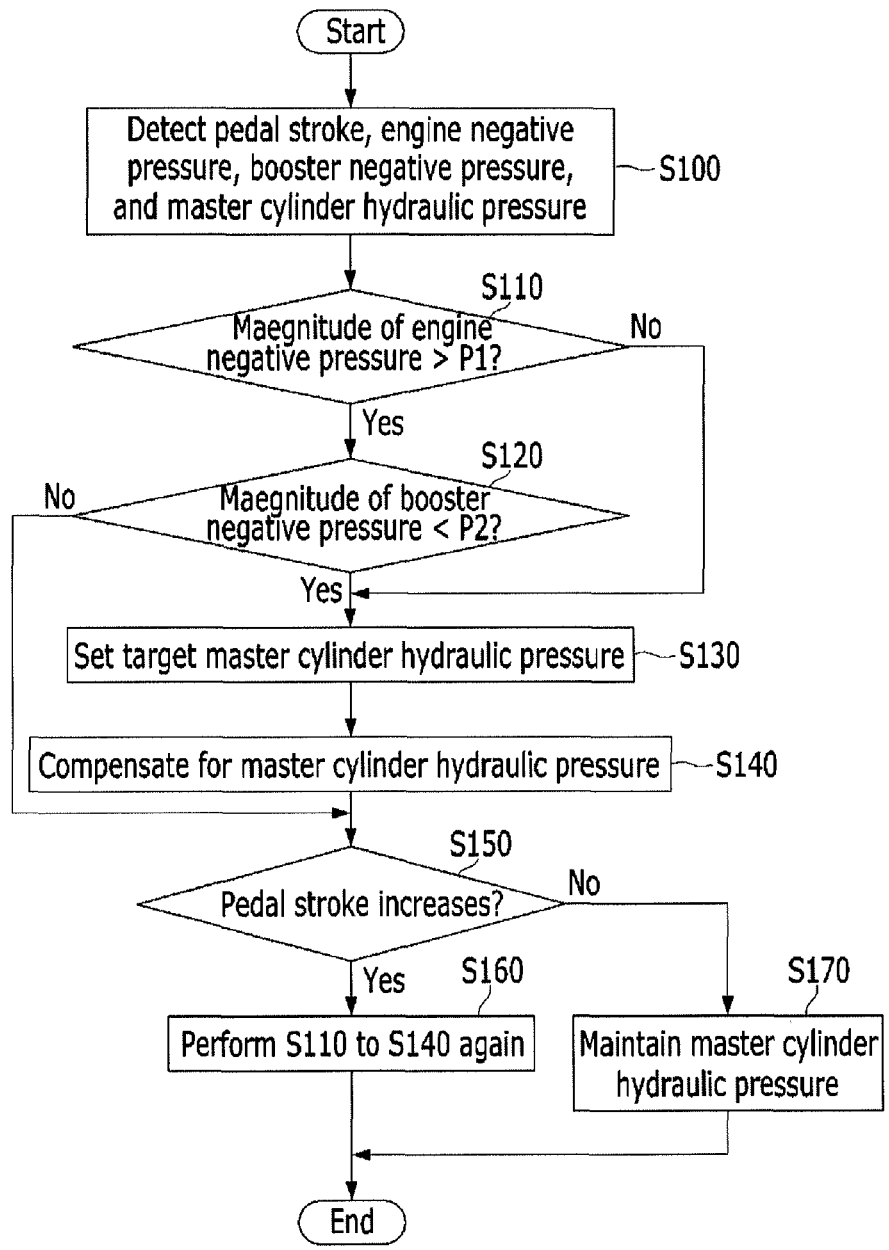
FIG. 4 is a flowchart of an exemplary method for controlling braking of a vehicle according to the present invention.

FIG. 4 is a flowchart of a method for controlling braking of a vehicle according to various embodiments of the present invention.

Referring to FIG. 4, first, a pedal stroke, engine negative pressure, booster negative pressure, and master cylinder hydraulic pressure are detected (S100).

The control unit 60 compares a magnitude of the detected engine negative pressure with a magnitude P1 of predetermined reference engine negative pressure (S110). The magnitude P1 of the predetermined reference engine negative pressure is set in consideration of a magnitude of engine negative pressure that is required to brake, and may be about 0 mmHg.

In a case in which a magnitude of the detected engine negative pressure is greater than the magnitude P1 of the predetermined reference engine negative pressure, the control unit 60 compares a magnitude of the detected booster negative pressure with a magnitude P2 of predetermined reference booster negative pressure (S120).

The magnitude P2 of the predetermined reference booster negative pressure is set in consideration of a magnitude of booster negative pressure that is required to brake, and may be about 380 mmHg.

In a case in which a magnitude of the detected engine negative pressure is smaller than the magnitude P1 of the predetermined reference engine negative pressure, or a magnitude of the detected booster negative pressure is smaller than the magnitude P2 of the predetermined reference booster negative pressure, the control unit 60 sets target master cylinder hydraulic pressure on the basis of the detected pedal stroke and the detected booster negative pressure (S130).

In the present specification, 'the target master cylinder hydraulic pressure' means master cylinder hydraulic pressure according to a pedal stroke in consideration of a magnitude of minimum booster negative pressure that is required to brake.

Referring to FIG. 3, in a case in which the magnitude of the predetermined reference booster negative pressure is 380 mmHg, the control unit 60 may set the target master cylinder hydraulic pressure according to the detected pedal stroke. That is, the target master cylinder hydraulic pressure may be set from master cylinder hydraulic pressure map data according to a pedal stroke at the predetermined reference booster negative pressure.

Next, in a case in which the detected master cylinder hydraulic pressure is smaller than the predetermined target master cylinder hydraulic pressure, the control unit 60 compensates for the master cylinder hydraulic pressure (S140). The control unit 60 controls opening and closing operations of the plurality of solenoid valves so as to increase the master cylinder hydraulic pressure up to the predetermined target master cylinder hydraulic pressure.

Next, the control unit 60 determines whether a pedal stroke increases (S150). That is, the control unit 60 determines whether a driver requires a larger magnitude of braking force.

In a case in which the pedal stroke increases, the control unit 60 performs steps S110 to S140 again (S160), and maintains the master cylinder hydraulic pressure when the pedal stroke is maintained (S170).

FIG. 5 is a flowchart of a method for controlling braking of a vehicle according to various embodiments of the present invention.

A description, which is the same as that of the embodiment illustrated in FIG. 4 that has been described above, will be omitted.

Referring to FIG. 5, first, a pedal stroke, engine negative pressure, booster negative pressure, master cylinder hydraulic pressure, and a vehicle speed are detected (S200).

The control unit 60 compares a magnitude of the detected engine negative pressure with a magnitude P1 of predetermined reference engine negative pressure (S210). The magnitude P1 the predetermined reference engine negative pressure is set in consideration of a magnitude of engine negative pressure that is required to brake, and may be about 0 mmHg.

In a case in which a magnitude of the detected engine negative pressure is greater than the magnitude P1 of the predetermined reference engine negative pressure, the control unit 60 compares a magnitude of the detected booster negative pressure with a magnitude P2 of predetermined reference booster negative pressure (S220).

The magnitude P2 of the predetermined reference booster negative pressure is set in consideration of a magnitude of booster negative pressure that is required to brake, and may be about 380 mmHg.

In a case in which a magnitude of the detected engine negative pressure is smaller than the magnitude P1 of the predetermined reference engine negative pressure, or a magnitude of the detected booster negative pressure is smaller than the magnitude P2 of the predetermined reference booster negative pressure, the control unit 60 compares the detected vehicle speed and a predetermined vehicle speed Vset (S230). The predetermined vehicle speed Vset may be set in consideration of traveling stability, and may be about 50 km/h.

In a case in which the detected vehicle speed is higher than the predetermined vehicle speed Vset, the control unit 60 controls the booster 35 so that boosting force is amplified (S240). The booster 35 may be operated by an operation of a brake assist system (BAS). The brake assist system may be a brake booster assist device which is used in a situation in which emergency braking is required.

In a case in which the detected vehicle speed is lower than the predetermined vehicle speed Vset, the control unit 60 sets target master cylinder hydraulic pressure on the basis of the detected pedal stroke and the detected booster negative pressure (S250).

Next, in a case in which the detected master cylinder hydraulic pressure is smaller than the predetermined target master cylinder hydraulic pressure, the control unit 60 compensates for the master cylinder hydraulic pressure (S260). The control unit 60 controls opening and closing operations of the plurality of solenoid valves so as to increase the master cylinder hydraulic pressure up to the predetermined target master cylinder hydraulic pressure.

Next, the control unit 60 determines whether a pedal stroke increases (S270). That is, the control unit 60 determines whether a driver requires a larger magnitude of braking force.

In a case in which the pedal stroke increases, the control unit 60 performs steps S210 to S260 again (S280), and maintains the master cylinder hydraulic pressure when the pedal stroke is maintained (S290).

As described above, according to various embodiments of the present invention, stable braking force may be provided by compensating for the master cylinder hydraulic pressure even in a case in which it is difficult to form negative pressure due to a malfunction of an intake system, or the like.

In addition, according to various embodiments of the present invention, precise braking force may be provided by confirming a driver's intention to brake from a brake stroke sensor.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling braking of a vehicle, comprising:
   detecting a pedal stroke, booster negative pressure, and master cylinder hydraulic pressure;
   setting target master cylinder hydraulic pressure on the basis of the detected pedal stroke and the detected booster negative pressure in a case in which a magnitude of the detected booster negative pressure is smaller than a magnitude of predetermined reference booster negative pressure;
   compensating for the master cylinder hydraulic pressure in a case in which the detected master cylinder hydraulic pressure is smaller than the predetermined target master cylinder hydraulic pressure; and
   detecting engine negative pressure,
   wherein in a case in which a magnitude of the detected engine negative pressure is greater than a magnitude of predetermined reference engine negative pressure, the magnitude of the detected booster negative pressure is compared with the magnitude of the predetermined reference booster negative pressure, and
   in a case in which the magnitude of the detected engine negative pressure is smaller than the magnitude of the predetermined reference engine negative pressure, target master cylinder hydraulic pressure is set on the basis of the detected pedal stroke and the detected booster negative pressure.

2. The method of claim 1, wherein:
   the predetermined target master cylinder hydraulic pressure is set from master cylinder hydraulic pressure map data according to a pedal stroke at the predetermined reference booster negative pressure.

3. The method of claim 1, wherein:
   in the compensating for the master cylinder hydraulic pressure, opening and closing operations of a plurality of solenoid valves are controlled so as to increase the master cylinder hydraulic pressure up to the predetermined target master cylinder hydraulic pressure.

4. A method for controlling braking of a vehicle, comprising:
   detecting a pedal stroke, booster negative pressure, and master cylinder hydraulic pressure;
   setting target master cylinder hydraulic pressure on the basis of the detected pedal stroke and the detected booster negative pressure in a case in which a magnitude of the detected booster negative pressure is smaller than a magnitude of predetermined reference booster negative pressure;
   compensating for the master cylinder hydraulic pressure in a case in which the detected master cylinder hydraulic pressure is smaller than a predetermined target master cylinder hydraulic pressure;
   detecting a vehicle speed; and
   comparing the detected vehicle speed and a predetermined vehicle speed in a case in which the magnitude of the detected booster negative pressure is smaller than the magnitude of the predetermined reference booster negative pressure,
   wherein in a case in which the detected vehicle speed is higher than the predetermined vehicle speed, a booster is controlled so that boosting force is amplified, and
   in a case in which the detected vehicle speed is lower than the predetermined vehicle speed, target master cylinder hydraulic pressure is set on the basis of the detected pedal stroke and the detected booster negative pressure.

5. The method of claim 1, further comprising:
   detecting a vehicle speed; and
   comparing the detected vehicle speed and a predetermined vehicle speed in a case in which the magnitude of the detected engine negative pressure is smaller than the magnitude of the predetermined reference engine negative pressure,
   wherein in a case in which the detected vehicle speed is higher than the predetermined vehicle speed, a booster is controlled so that boosting force is amplified, and
   in a case in which the detected vehicle speed is lower than the predetermined vehicle speed, target master cylinder hydraulic pressure is set on the basis of the detected pedal stroke and the detected booster negative pressure.

6. The method of claim 1, further comprising:
   determining whether the pedal stroke increases in a case in which the master cylinder hydraulic pressure is compensated and becomes the same as the predetermined target master cylinder hydraulic pressure,
   wherein in a case in which the pedal stroke increases, the setting of the target master cylinder hydraulic pressure and the compensating for the master cylinder hydraulic pressure are performed again.

7. A system for controlling braking of a vehicle, comprising:
   a pedal stroke sensor configured to detect a pedal stroke of a brake pedal;
   a booster negative pressure sensor configured to detect a booster negative pressure of a booster;
   a master cylinder hydraulic pressure sensor configured to detect a master cylinder hydraulic pressure of a master cylinder;
   a driving unit including a plurality of solenoid valves and configured to adjust the master cylinder hydraulic pressure supplied from the master cylinder to a wheel cylinder;
   a manifold absolute pressure (MAP) sensor configured to detect air pressure in an intake manifold,
   wherein the control unit is operated by a predetermined program so as to control the driving unit on the basis of information inputted through the pedal stroke sensor, the MAP sensor, the booster negative pressure sensor and the master cylinder hydraulic pressure sensor, and
   the predetermined program operating the control unit including a series of commands to perform a method comprising:
      detecting the pedal stroke, the booster negative pressure, and the master cylinder hydraulic pressure;
      setting target master cylinder hydraulic pressure on the basis of the detected pedal stroke and the detected booster negative pressure in a case in which a magnitude of the detected booster negative pressure is smaller than a magnitude of predetermined reference booster negative pressure; and compensating for the master cylinder hydraulic pressure in a case in which the detected master cylinder hydraulic pressure is smaller than the predetermined target master cylinder hydraulic pressure; and wherein in a case in which a magnitude of a detected engine negative pressure is greater than a magnitude of a predetermined reference engine negative pressure, the magnitude of the detected booster negative pressure is compared with the magnitude of the predetermined reference booster negative pressure; and in a case in which the magnitude of the detected engine negative pressure is smaller than the magnitude of the predetermined reference engine negative pressure, the target master cylinder hydraulic pressure is set on the basis of the detected pedal stroke and the detected booster negative pressure.

8. A system for controlling braking of a vehicle, comprising:

a pedal stroke sensor configured to detect a pedal stroke of a brake pedal;

a manifold absolute pressure (MAP) sensor configured to detect air pressure in an intake manifold;

a booster negative pressure sensor configured to detect booster negative pressure of a booster;

a wheel speed sensor configured to detect a vehicle speed;

a master cylinder hydraulic pressure sensor configured to detect master cylinder hydraulic pressure of a master cylinder;

a driving unit including a plurality of solenoid valves and configured to adjust hydraulic pressure supplied from the master cylinder to a wheel cylinder; and a control unit operated by a predetermined program so as to control the driving unit on the basis of information inputted through the pedal stroke sensor, the MAP sensor, the booster negative pressure sensor, the wheel speed sensor, and the master cylinder hydraulic pressure sensor, wherein the predetermined program includes a series of commands to perform a method comprising:

detecting the pedal stroke, the booster negative pressure, and the master cylinder hydraulic pressure;

setting target master cylinder hydraulic pressure on the basis of the detected pedal stroke and the detected booster negative pressure in a case in which a magnitude of the detected booster negative pressure is smaller than a magnitude of predetermined reference booster negative pressure;

compensating for the master cylinder hydraulic pressure in a case in which the detected master cylinder hydraulic pressure is smaller than a predetermined target master cylinder hydraulic pressure;

detecting the vehicle speed; and comparing the detected vehicle speed and a predetermined vehicle speed in a case in which the magnitude of the detected booster negative pressure is smaller than the magnitude of the predetermined reference booster negative pressure, wherein in a case in which the detected vehicle speed is higher than the predetermined vehicle speed, the booster is controlled so that boosting force is amplified, and in a case in which the detected vehicle speed is lower than the predetermined vehicle speed, the target master cylinder hydraulic pressure is set on the basis of the detected pedal stroke and the detected booster negative pressure.

9. The method of claim 4, wherein:

the predetermined target master cylinder hydraulic pressure is set from master cylinder hydraulic pressure map data according to a pedal stroke at the predetermined reference booster negative pressure.

10. The method of claim 4, wherein:

in the compensating for the master cylinder hydraulic pressure, opening and closing operations of a plurality of solenoid valves are controlled so as to increase the master cylinder hydraulic pressure up to the predetermined target master cylinder hydraulic pressure.

11. The method of claim 4, further comprising:

determining whether the pedal stroke increases in a case in which the master cylinder hydraulic pressure is compensated and becomes the same as the predetermined target master cylinder hydraulic pressure, wherein in a case in which the pedal stroke increases, the setting of the target master cylinder hydraulic pressure and the compensating for the master cylinder hydraulic pressure are performed again.

12. The method of claim 8, wherein:

the predetermined target master cylinder hydraulic pressure is set from master cylinder hydraulic pressure map data according to a pedal stroke at the predetermined reference booster negative pressure.

13. The method of claim 8, wherein:

in the compensating for the master cylinder hydraulic pressure, opening and closing operations of a plurality of solenoid valves are controlled so as to increase the master cylinder hydraulic pressure up to the predetermined target master cylinder hydraulic pressure.

14. The method of claim 8, further comprising:

determining whether a pedal stroke increases in a case in which the master cylinder hydraulic pressure is compensated and becomes the same as the predetermined target master cylinder hydraulic pressure, wherein in a case in which the pedal stroke increases, the setting of the target master cylinder hydraulic pressure and the compensating for the master cylinder hydraulic pressure are performed again.

* * * * *